US012111159B2

(12) United States Patent
Hosoya

(10) Patent No.: US 12,111,159 B2
(45) Date of Patent: Oct. 8, 2024

(54) AZIMUTH ESTIMATION DEVICE

(71) Applicant: HONDA MOTOR CO., LTD., Tokyo (JP)

(72) Inventor: Tomoyuki Hosoya, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 491 days.

(21) Appl. No.: 17/540,438

(22) Filed: Dec. 2, 2021

(65) Prior Publication Data

US 2022/0178698 A1 Jun. 9, 2022

(30) Foreign Application Priority Data

Dec. 8, 2020 (JP) ................................ 2020-203267

(51) Int. Cl.
*G01C 21/16* (2006.01)
*G01S 19/42* (2010.01)
(Continued)

(52) U.S. Cl.
CPC ............ *G01C 21/165* (2013.01); *G01S 19/42* (2013.01); *G01D 1/04* (2013.01); *G01D 1/16* (2013.01)

(58) Field of Classification Search
CPC .......... G01S 19/42; G01S 19/47; G01S 19/49; G01C 19/005; G01C 19/02; G01C 19/025;
(Continued)

(56) References Cited

U.S. PATENT DOCUMENTS

2008/0027601 A1* 1/2008 Sewaki .................. G01C 19/42
701/31.4
2008/0269988 A1* 10/2008 Feller .................... G05D 1/0278
701/41
(Continued)

FOREIGN PATENT DOCUMENTS

JP  H03245075 A  10/1991
JP  H0626865 A   2/1994
(Continued)

OTHER PUBLICATIONS

JP 2000186937 A machine translation (Year: 2000).*
(Continued)

*Primary Examiner* — Fadey S. Jabr
*Assistant Examiner* — Mark Robert Heim
(74) *Attorney, Agent, or Firm* — Armstrong Teasdale LLP

(57) ABSTRACT

A sensor bias estimation device for estimating a bias of a yaw angular velocity sensor of a vehicle, includes: a bias estimation unit that acquires a yaw angular velocity integrated value by integrating a yaw angular velocity acquired from a yaw angular velocity sensor, acquires a GNSS azimuth from a GNSS unit which calculates, as the GNSS azimuth, an azimuth of the vehicle based on a GNSS signal, and acquires an estimated bias value based on an azimuth difference which is a difference between the yaw angular velocity integrated value and the GNSS azimuth; a first determination unit that determines whether a first condition that an accuracy of the GNSS azimuth acquired from the GNSS unit is within a prescribed range is met; and a bias decision unit that decides the estimated bias value as the bias of the yaw angular velocity sensor when the first condition is met.

5 Claims, 3 Drawing Sheets

(51) Int. Cl.
*G01D 1/04* (2006.01)
*G01D 1/16* (2006.01)

(58) Field of Classification Search
CPC ........ G01C 19/34; G01C 19/42; G01C 21/16;
G01C 21/165; G01C 21/18; G01C
21/183; G01C 21/188; G01C 25/005;
G01C 25/00; G01D 1/16; G01D 1/04
See application file for complete search history.

(56) References Cited

U.S. PATENT DOCUMENTS

| | | | | |
|---|---|---|---|---|
| 2008/0294342 | A1* | 11/2008 | Hoshizaki | G01S 19/47 701/472 |
| 2009/0088975 | A1* | 4/2009 | Sato | G01C 17/38 701/472 |
| 2010/0332135 | A1* | 12/2010 | Toda | G01S 19/49 701/472 |
| 2011/0172820 | A1* | 7/2011 | Kim | G01C 25/005 700/254 |
| 2014/0330507 | A1* | 11/2014 | Oikawa | G05D 1/0891 701/124 |
| 2016/0290810 | A1* | 10/2016 | Zhi | G01C 21/165 |
| 2018/0150086 | A1* | 5/2018 | Nobukawa | G08G 1/164 |
| 2018/0172842 | A1* | 6/2018 | Ding | G08G 1/005 |
| 2018/0202833 | A1* | 7/2018 | Suzuki | G01C 21/12 |
| 2019/0033465 | A1* | 1/2019 | Kido | G01S 19/40 |
| 2020/0150284 | A1* | 5/2020 | Miyajima | G01S 19/396 |
| 2020/0271689 | A1* | 8/2020 | Nichols | G01S 7/497 |
| 2021/0356605 | A1* | 11/2021 | Li | G01S 19/23 |

FOREIGN PATENT DOCUMENTS

| | | | | |
|---|---|---|---|---|
| JP | H0755480 | A | | 3/1995 |
| JP | H07218276 | A | | 8/1995 |
| JP | H08285621 | A | | 11/1996 |
| JP | 2000142581 | A | | 5/2000 |
| JP | 2000186937 | A | * | 7/2000 |
| JP | 2002162458 | A | * | 6/2002 |
| JP | 2009075005 | A | * | 4/2009 ............ G01C 17/38 |
| JP | 2015188605 | A | * | 11/2015 ........... G01C 21/165 |
| KR | 20190060575 | A | | 6/2019 |
| WO | WO-2015146048 | A1 | * | 10/2015 ........... G01C 21/165 |

OTHER PUBLICATIONS

WO-2015146048-A1 machine translation (Year: 2015).*
JP-2015188605-A machine translation (Year: 2015).*
JP-2009075005-A machine translation (Year: 2009).*
JP-2002162458-A machine translation (Year: 2002).*
Notice of Reasons for Refusal for Japanese Patent Application No. 2020-203267 dated Nov. 7, 2023; 6 pp.
Office Action for Chinese Patent Application No. 202111468237.9 dated Jun. 26, 2024; 24 pp.

* cited by examiner

AZIMUTH ESTIMATION DEVICE

TECHNICAL FIELD

The present invention relates to a sensor bias estimation device and a bias estimation method for estimating a bias of a yaw angular velocity sensor of a vehicle.

BACKGROUND ART

It is known that a gyro sensor for detecting an angular velocity of a vehicle has a bias (offset) regardless of whether the vehicle is traveling or is stopped, due to the influence of temperature and/or humidity. JPH6-26865A discloses an on-vehicle gyro sensor bias correction device which obtains an azimuth of the vehicle based on a GNSS (Global Navigation Satellite System) signal, also obtains an azimuth of the vehicle by integrating the yaw angular velocity output from a gyro sensor, calculates a bias of the gyro sensor during travel of the vehicle based on a difference between the two azimuths, and corrects an output of the gyro sensor.

However, the GNSS azimuth acquired based on the GNSS signal can include an error attributed to measurement noise and accuracy. Therefore, if the bias of the gyro sensor is estimated based on the GNSS azimuth at a certain moment, the estimated bias can significantly deviate from the true value.

SUMMARY OF THE INVENTION

In view of the foregoing background, a primary object of the present invention is to provide a sensor bias estimation device and a bias estimation method that can estimate an appropriate bias.

To achieve the above object, one aspect of the present invention provides a sensor bias estimation device (1) for estimating a bias (B) of a yaw angular velocity sensor (2) of a vehicle, comprising: a bias estimation unit (11) that acquires a yaw angular velocity integrated value (AS) by integrating a yaw angular velocity ($\gamma$) acquired from a yaw angular velocity sensor, acquires a GNSS azimuth (AG) from a GNSS unit (3) which calculates, as the GNSS azimuth, an azimuth of the vehicle based on a GNSS signal, and acquires an estimated bias value (BE) based on an azimuth difference ($\Delta A$) which is a difference between the yaw angular velocity integrated value and the GNSS azimuth; a first determination unit (13) that determines whether a first condition that an accuracy ($\sigma_{GNSS}$) of the GNSS azimuth acquired from the GNSS unit is within a prescribed range is met; and a bias decision unit (17) that decides the estimated bias value as the bias of the yaw angular velocity sensor when the first condition is met.

According to this aspect, since the estimated bias value is decided as the bias of the yaw angular velocity sensor when the accuracy of the GNSS azimuth is within a prescribed range (namely, when the first condition is met), it is possible to suppress deviation of the value of the bias from the true value.

In the above aspect, preferably, the sensor bias estimation device comprises: a stationary state bias estimation unit (12) that acquires a stationary state bias (BS) based on a signal from the yaw angular velocity sensor when the vehicle is stopped; and a second determination unit (14) that determines whether a second condition that a difference between the estimated bias value and the stationary state bias is within a prescribed range is met, wherein the bias decision unit decides the estimated bias value as the bias of the yaw angular velocity sensor when the first condition and the second condition are met.

According to this aspect, since the estimated bias value is decided as the bias of the yaw angular velocity sensor when the difference between the estimated bias value and the stationary state bias is within the prescribed range (namely, when the second condition is met), it is possible to suppress deviation of the value of the bias from the true value.

In the above aspect, preferably, the sensor bias estimation device comprises a third determination unit (15) that determines whether a third condition that the estimated bias value is within a prescribed range is met, wherein the bias decision unit decides the estimated bias value as the bias of the yaw angular velocity sensor when the first condition and the third condition are met.

According to this aspect, since the estimated bias value is decided as the bias of the yaw angular velocity sensor when the estimated bias value is within the prescribed range (namely, when the third condition is met), it is possible to suppress deviation of the value of the bias from the true value.

In the above aspect, preferably, the sensor bias estimation device comprises a third determination unit (15) that determines whether a third condition that the estimated bias value is within a prescribed range is met, wherein the bias decision unit decides the estimated bias value as the bias of the yaw angular velocity sensor when the first condition, the second condition, and the third condition are met.

According to this aspect, it is possible to suppress deviation of the bias value from the true value.

In the above aspect, preferably, the bias estimation unit estimates the estimated bias value at a prescribed time interval, and the bias decision unit decides an average value of multiple estimated bias values acquired when all of the first condition, the second condition, and the third condition are met as the bias of the yaw angular velocity sensor.

According to this aspect, even in a case where the estimated bias value momentarily deviates from the true value, an influence thereof on the bias that is set can be reduced.

In the above aspect, preferably, the bias estimation unit acquires the yaw angular velocity integrated value by integrating the yaw angular velocity from which the estimated bias value is subtracted.

Another aspect of the present invention provides a bias estimation method for a yaw angular velocity sensor (2) of a vehicle, comprising: acquiring an azimuth of the vehicle as a sensor azimuth (AS) by integrating a yaw angular velocity ($\gamma$) set based on a signal from a yaw angular velocity sensor; acquiring a GNSS azimuth (AG) and an accuracy ($\sigma_{GNSS}$) of the GNSS azimuth from a GNSS unit (3) which calculates, as the GNSS azimuth, an azimuth of the vehicle based on a GNSS signal; acquiring an estimated bias value (BE) by multiplying an azimuth difference ($\Delta A$) which is a difference between the sensor azimuth and the GNSS azimuth by a prescribed amplification factor (K); acquiring a stationary state bias (BS) based on the signal from the yaw angular velocity sensor when the vehicle is stopped; determining whether a first condition that the accuracy of the GNSS azimuth is within a prescribed range is met based on information related to the accuracy of the GNSS azimuth; determining whether a second condition that a difference between the estimated bias value and the stationary state bias is within a prescribed range is met; determining whether a third condition that the estimated bias value is within a prescribed range is met; and deciding the estimated bias value as the bias (B) of the yaw angular velocity sensor when all of the first condition, the second condition, and the third condition are met.

According to this aspect, it is possible to prevent the value of the bias from significantly deviating from the true value.

In the above aspect, preferably, the method comprises, instead of deciding the estimated bias value as the bias of the yaw angular velocity sensor, deciding an average value of multiple estimated bias values acquired when all of the first condition, the second condition, and the third condition are met as the bias of the yaw angular velocity sensor.

According to this aspect, even in a case where the estimated bias value may momentarily deviate from the true value, an influence thereof on the bias that is set can be reduced.

According to the foregoing configuration, it is possible to provide a sensor bias estimation device and a bias estimation method that can estimate an appropriate bias.

DESCRIPTION OF THE PREFERRED EMBODIMENT(S)

Figure 1:
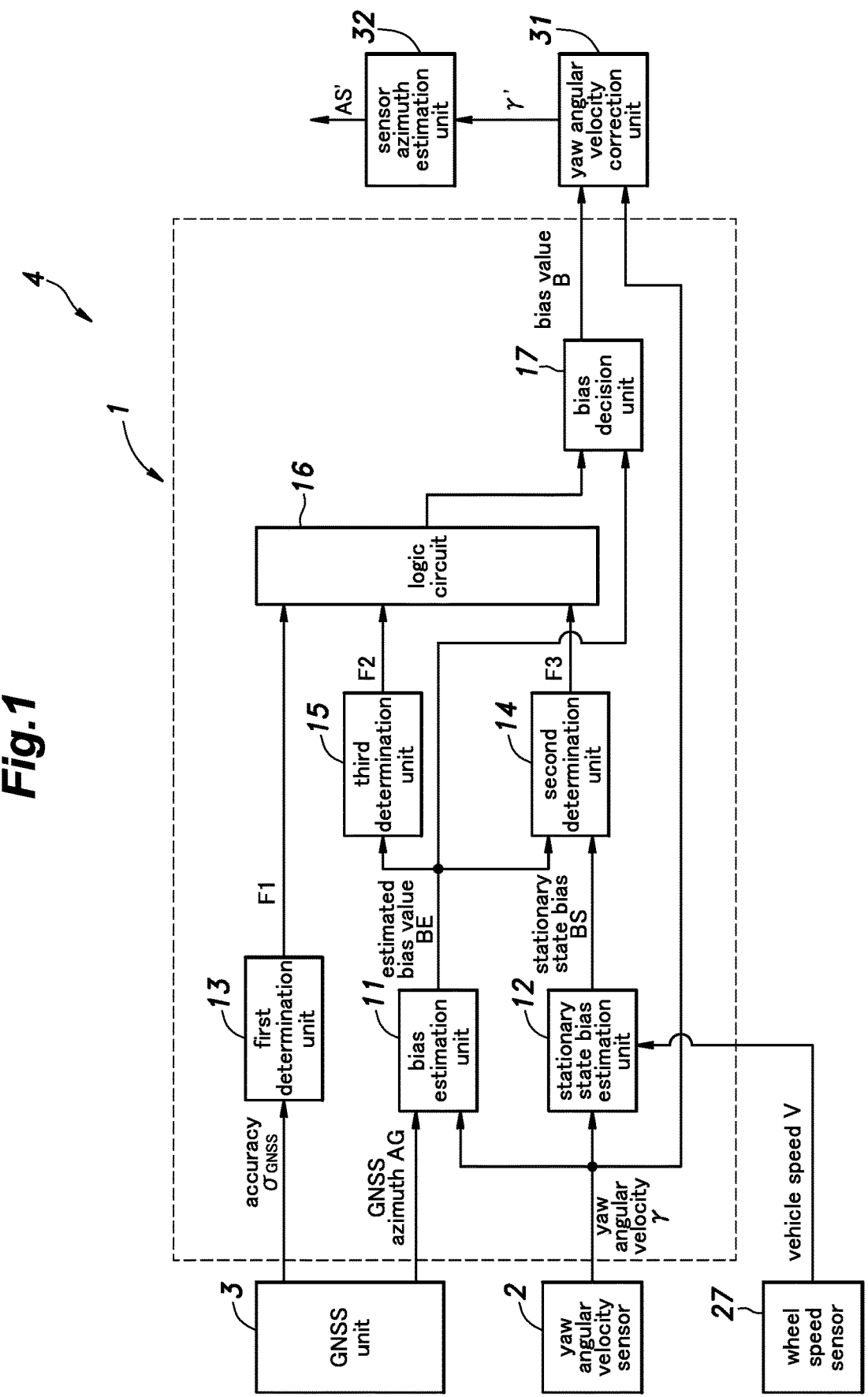
FIG. 1 is a configuration diagram of a sensor bias estimation device according to an embodiment of the present invention.

In the following, an embodiment of a sensor bias estimation device 1 and bias estimation method according to the present invention will be described with reference to the drawings. The sensor bias estimation device 1 estimates a bias of a yaw angular velocity sensor 2 of a vehicle. As shown in FIG. 1, the sensor bias estimation device 1 is connected with the yaw angular velocity sensor 2 and a GNSS unit 3. The sensor bias estimation device 1, the yaw angular velocity sensor 2, and the GNSS unit 3 constitute an azimuth estimation device 4 that estimates an azimuth of the vehicle. The azimuth estimation device 4 constitutes a part of a high accuracy own-vehicle position detection device (Map Positioning Unit: MPU) of the vehicle.

The yaw angular velocity sensor 2 may be a known gyro sensor. For example, the yaw angular velocity sensor 2 may be a vibration gyro sensor which causes an element to vibrate and detects the angular velocity from the Coriolis force applied to the element, an optical gyro sensor such as an optical fiber gyro sensor that uses the Signac effect and a ring laser gyro, or the like. The yaw angular velocity sensor 2 detects the angular velocity about the Z axis (vertical axis) of the vehicle, namely, a yaw angular velocity γ (yaw rate). The yaw angular velocity sensor 2 may be configured as a six-axis sensor that detects an acceleration in the X axis (front-rear axis) direction of the vehicle, an acceleration in the Y axis (the horizontal axis) direction of the vehicle, an acceleration in the Z axis direction of the vehicle, an angular velocity about the X axis, and an angular velocity about the Y axis in addition to the angular velocity about the Z axis. Namely, the yaw angular velocity sensor 2 may be configured by an inertial measurement unit (IMU). Also, the yaw angular velocity sensor 2 may be configured as a three-axis sensor by being combined with sensors for detecting the acceleration in the X axis direction of the vehicle and the acceleration in the Y axis direction of the vehicle. The yaw angular velocity sensor 2 outputs a signal corresponding to the yaw angular velocity of the vehicle.

The GNSS (Global Navigation Satellite System) unit 3 has an antenna for receiving the GNSS signal from multiple artificial satellites (positioning satellites) and a calculation unit for acquiring the position and azimuth of the vehicle based on the received GNSS signal. The position and azimuth of the vehicle acquired by the GNSS unit 3 will be referred to as a GNSS position and a GNSS azimuth AG, respectively. The calculation unit is configured by an electronic control device (ECU) which includes a CPU, a non-volatile memory (ROM), a volatile memory (RAM), and the like. The GNSS unit 3 may have multiple antennas, for example, and the calculation unit may acquire the GNSS azimuth AG by determining the relative position of each antenna based on the GNSS signal. Also, the GNSS unit 3 may acquire the travel direction of the vehicle as the GNSS azimuth AG based on the positional change of the moving vehicle. The GNSS unit 3 acquires the GNSS position and the GNSS azimuth AG at a prescribed time interval and outputs them to the sensor bias estimation device 1. Also, the GNSS unit 3 calculates the standard deviation of the GNSS azimuth AG acquired at the prescribed time interval and outputs the standard deviation of the GNSS azimuth AG to the sensor bias estimation device 1 as a GNSS azimuth accuracy.

The sensor bias estimation device 1 is configured by an electronic control device (ECU) which includes a CPU, a non-volatile memory (ROM), a volatile memory (RAM), and the like. The sensor bias estimation device 1 and the GNSS unit 3 may be configured as an integral electronic control unit. The sensor bias estimation device 1 includes a bias estimation unit 11, a stationary state bias estimation unit 12, a first determination unit 13, a second determination unit 14, a third determination unit 15, a logic circuit 16, and a bias decision unit 17.

Figure 2:
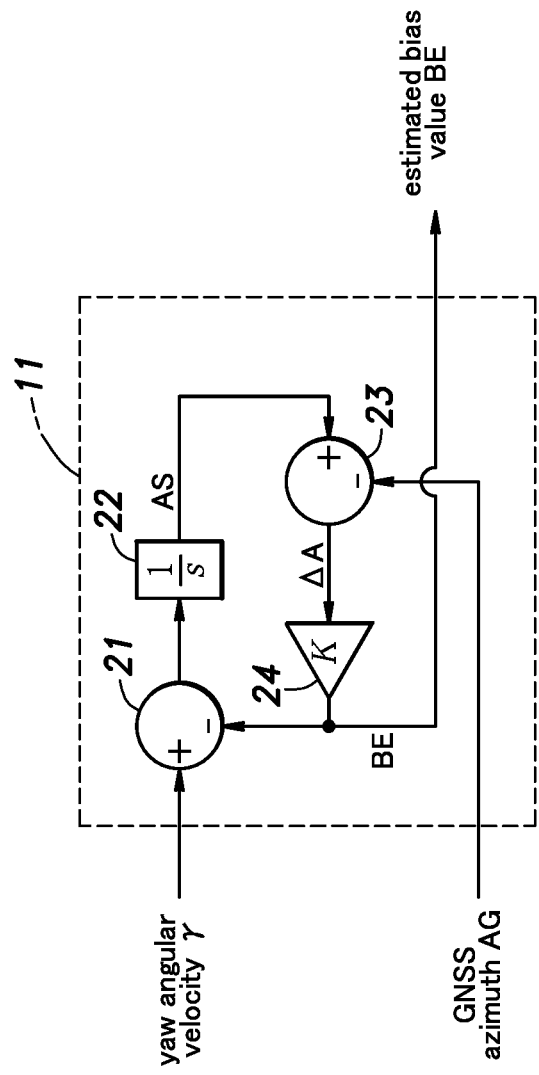
FIG. 2 is a configuration diagram of a bias estimation unit.

The bias estimation unit 11 acquires a yaw angular velocity integrated value AS by integrating the yaw angular velocity γ acquired from the yaw angular velocity sensor 2, acquires the GNSS azimuth AG from the GNSS unit 3, and acquires an estimated bias value BE based on an azimuth difference ΔA which is a difference between the yaw angular velocity integrated value AS and the GNSS azimuth AG. As shown in FIG. 2, the bias estimation unit 11 includes a first subtractor 21, an integrator 22, a second subtractor 23, and an amplifier 24. The yaw angular velocity γ from the yaw angular velocity sensor 2 and the GNSS azimuth AG from the GNSS unit 3 are input to the bias estimation unit 11, and the estimated bias value BE is output from the sensor bias estimation device 1.

The first subtractor 21 subtracts the estimated bias value BE from the yaw angular velocity γ input from the yaw angular velocity sensor 2. The integrator 22 calculates the yaw angular velocity integrated value AS by integrating a signal corresponding to the yaw angular velocity γ output from the first subtractor 21, with the initial value of integration being set appropriately. The yaw angular velocity integrated value AS corresponds to an angle of the vehicle about the Z axis, namely, an azimuth of the vehicle. The second subtractor 23 subtracts the GNSS azimuth AG from the yaw angular velocity integrated value AS to calculate the difference between the yaw angular velocity integrated value AS and the GNSS azimuth AG as the azimuth difference ΔA. The amplifier 24 multiplies the difference between the yaw angular velocity integrated value AS and the GNSS azimuth AG by a prescribed amplification factor K to calculate the estimated bias value BE. The amplification factor K is set to convert the azimuth difference ΔA into a value corresponding to an angular velocity. The calculated estimated bias value BE is output from the bias estimation unit 11 and is input to the first subtractor 21. Namely, the bias estimation unit 11 configures a feedback circuit.

The stationary state bias estimation unit 12 acquires a stationary state bias BS based on the signal from the yaw angular velocity sensor 2 when the vehicle is stopped. When the vehicle is stopped, the true value of the yaw angular velocity γ is 0 (zero). Therefore, the value of the yaw angular velocity γ output from the yaw angular velocity sensor 2 when the vehicle is stopped is regarded as the stationary state bias BS. The stationary state bias estimation unit 12 determines whether the vehicle is stopped based on a vehicle speed V and sets the yaw angle input from the yaw angular velocity sensor 2 when the vehicle is stopped as the stationary state bias BS. The stationary state bias estimation unit 12 preferably estimates the stationary state bias BS every time when the ignition is turned on or every time when the vehicle stops due to traffic light or the like, for example. The vehicle speed V is preferably acquired based on the signal from the wheel speed sensor 27, for example.

The first determination unit 13 determines whether a first condition that an accuracy $\sigma_{GNSS}$ of the GNSS azimuth AG acquired from the GNSS unit 3 is within a prescribed range is met. Here, the accuracy GNSS of the GNSS azimuth AG is represented by a standard deviation of the GNSS azimuth AG. In the present embodiment, the first determination unit 13 determines that the first condition is met when the accuracy $\sigma_{GNSS}$ of the GNSS azimuth AG is less than or equal to a first prescribed determination value. Namely, the first determination unit 13 determines whether the GNSS azimuth AG is a reliable value. The first determination unit 13 outputs a true or false determination result to the logic circuit 16.

The second determination unit 14 determines whether a second condition that the difference ΔB1 between the estimated bias value BE and the stationary state bias BS is within a prescribed range is met. The second determination unit 14 preferably determines that the second condition is met when the absolute value of the difference ΔB1 between the estimated bias value BE and the stationary state bias BS is less than or equal to a second prescribed determination value. When close to the true value, the estimated bias value BE is close to the stationary state bias BS. Therefore, when the second condition is met, it can be assumed that an error of the estimated bias value BE is small. Namely, the second determination unit 14 determines whether the estimated bias value BE is a reliable value. The second determination unit 14 outputs a true or false determination result to the logic circuit 16.

The third determination unit 15 determines whether a third condition that the estimated bias value BE is within a prescribed range is met. The third determination unit 15 preferably determines that the third condition is met when the estimated bias value BE is within a preset third determination range. The third determination range is used to determine whether the estimated bias value BE is within an assumed range. The third determination range is a range defined according to the configuration of the yaw angular velocity sensor 2 and is preferably set based on a result of experiment and/or simulation conducted beforehand. The third determination unit 15 determines whether the estimated bias value BE is a reliable value. The third determination unit 15 outputs a true or false determination result to the logic circuit 16.

The logic circuit 16 outputs a true or false determination result based on the determination results from the first determination unit 13, the second determination unit 14, and the third determination unit 15. In the present embodiment, the logic circuit 16 outputs a true determination result when the determination results from the first determination unit 13, the second determination unit 14, and the third determination unit are all true. Namely, the logic circuit 16 is configured as an AND circuit. In another embodiment, the logic circuit 16 may be configured as an OR circuit which outputs a true determination result when at least one of the determination results from the first determination unit 13, the second determination unit 14, and the third determination unit 15 is true. Also, the logic circuit 16 may be configured to output a true determination result when at least two of the determination results from the first determination unit 13, the second determination unit 14, and the third determination unit 15 are true.

The bias decision unit 17 decides the bias value B of the yaw angular velocity sensor 2 based on the estimated bias value BE output from the bias estimation unit 11 and the determination result output from the logic circuit 16. The bias decision unit 17 decides the estimated bias value BE as the bias value B when the determination result output from the logic circuit 16 is true. Thereby, in the present embodiment, the bias decision unit 17 decides the estimated bias value BE as the bias value B of the yaw angular velocity sensor 2 when the first condition, the second condition, and the third condition are met. In another embodiment, the bias decision unit 17 may decide the estimated bias value BE as the bias value B of the yaw angular velocity sensor 2 when at least one of the first condition, the second condition, and the third condition is met or when at least two of the first condition, the second condition, and the third condition are met.

Also, the bias decision unit 17 may preferably decide an average value of multiple estimated bias values BE when the determination result output from the logic circuit 16 is true as the bias value B of the yaw angular velocity sensor 2. Namely, the bias decision unit 17 may samples the estimated bias value BE when the determination result output from the logic circuit 16 is true multiple times and decide the average value of the sampled multiple estimated bias values BE as the bias value B. The number of sampling times can be set by the following formula provided that the confidence interval is 2σ, for example, according to the central limit theorem:

$$N = 2\sigma_{bias}/\omega_{bias})^2 \ldots \quad (1)$$

where N is the number of samplings, $\sigma_{bias}$ is a standard deviation of the estimated bias value BE, and $\omega_{bias}$ is a target bias accuracy (error). As a source of noise in the estimated bias value BE, there is measurement noise of the yaw angular velocity γ and the GNSS azimuth AG. It is assumed here that the noise component in the yaw angular velocity γ can be ignored as it is very small after the integration. The noise component in the GNSS azimuth AG can be assumed to be $\sigma_{GNSS}$ based on the accuracy (standard deviation) of the GNSS azimuth AG. Therefore, it can be assumed that the standard deviation $\sigma_{bias}$ of the estimated bias value BE is a value obtained by multiplying the accuracy (standard deviation) $\sigma_{GNSS}$ of the GNSS azimuth AG by the amplification factor K of the amplifier 24 ($\sigma_{bias} = K \times \sigma_{GNSS}$). For example, in a case where the accuracy $\sigma_{GNSS}$ of the GNSS azimuth AG is 2.5, the amplification factor K is 0.2, and the target bias accuracy $\omega_{bias}$ is 0.015, the sampling number is 4444. In a case where the bias decision unit 17 conducts sampling every 10 ms, it needs about 44.4 seconds to decide the bias value B.

The bias decision unit 17 outputs the decided bias value B to a yaw angular velocity correction unit 31 as an output of the sensor bias estimation device 1. The yaw angular velocity correction unit 31 subtracts the bias value B from the yaw angular velocity γ output from the yaw angular velocity sensor 2 to output a yaw angular velocity correction value γ'. A sensor azimuth estimation unit 32 integrates the yaw angular velocity correction value γ' thereby to calculate a corrected sensor azimuth AS'.

Figure 3:
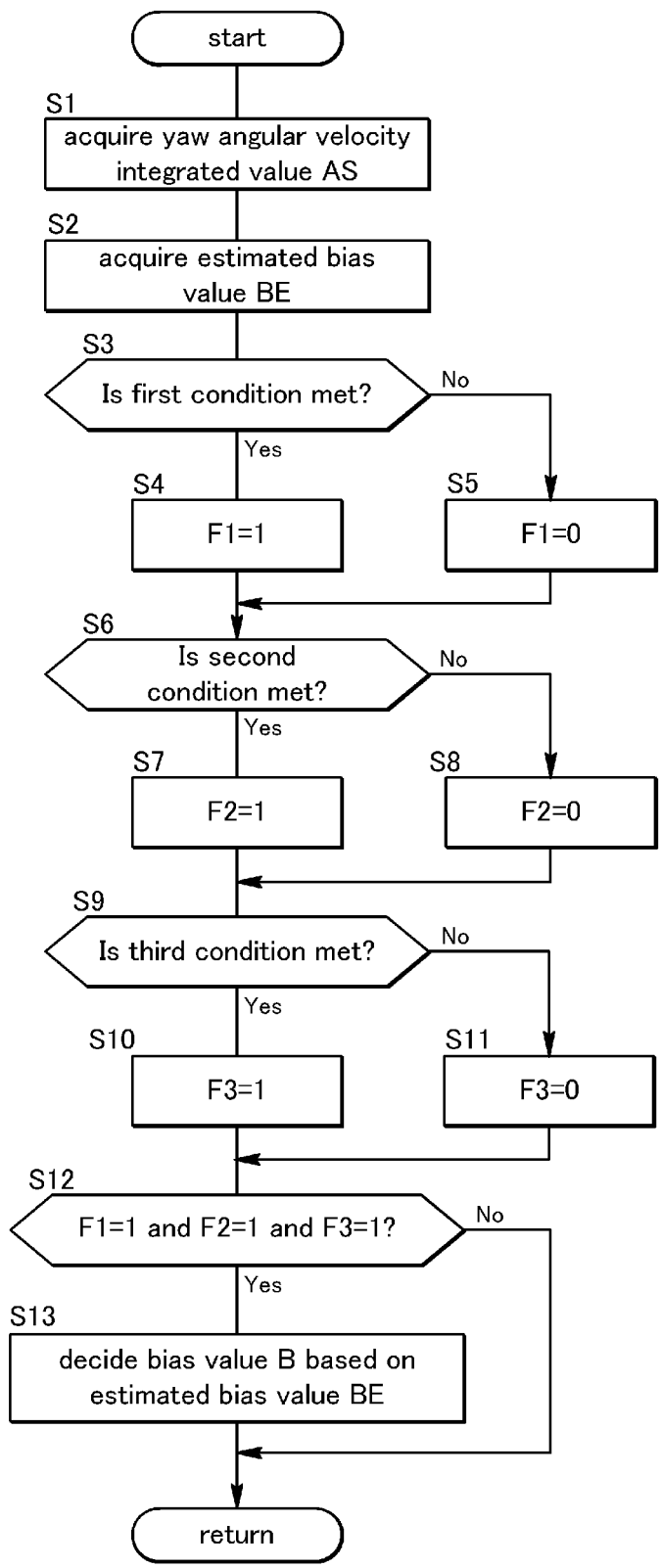
FIG. 3 is a flowchart showing a procedure of a bias estimation method.

The sensor bias estimation device 1 described above executes a bias estimation method shown by a flowchart of FIG. 3. The sensor bias estimation device 1 executes the flow of FIG. 3 at a time interval of 10 ms, for example. First, the bias estimation unit 11 acquires the yaw angular velocity integrated value AS by integrating the yaw angular velocity γ acquired from the yaw angular velocity sensor 2 (S1). Then, the bias estimation unit 11 calculates the azimuth difference ΔA, which is a difference between the yaw angular velocity integrated value AS and the GNSS azimuth AG acquired from the GNSS unit 3 and multiplies the azimuth difference ΔA by the amplification factor K thereby to acquire the estimated bias value BE (S2).

Subsequently, the first determination unit 13 determines whether the first condition that the accuracy $\sigma_{GNSS}$ of the GNSS azimuth AG acquired from the GNSS unit 3 is within a prescribed range is met (S3). The first determination unit 13 sets a first flag F1 to 1 when the first condition is met (S4) and sets the first flag F1 to 0 when the first condition is not met (S5).

Then, the second determination unit 14 determines whether the second condition that the difference between the estimated bias value BE and the stationary state bias BS is within a prescribed range is met (S6). The stationary state bias BS is acquired by the stationary state bias estimation unit 12 when the vehicle is stopped. The second determination unit 14 sets a second flag F2 to 1 when the second condition is met (S7) and sets the second flag F2 to 0 when the second condition is not met (S8).

Subsequently, the third determination unit 15 determines whether the third condition that the estimated bias value BE is within a prescribed range is met (S9). The third determination unit 15 sets a third flag F3 to 1 when the third condition is met (S10) and sets the third flag F3 to 0 when the third condition is not met (S11).

Then, the bias decision unit 17 determines whether the first flag F1, the second flag F2, and the third flag F3 are all 1, namely, whether all of the first condition, the second condition, and the third condition are met (S12). When the first flag F1, the second flag F2, and the third flag F3 are all 1 (the determination result in S12 is Yes), the bias decision unit 17 decides the bias value B of the yaw angular velocity sensor 2 based on the estimated bias value BE that has been calculated (S13). Preferably, the bias decision unit 17 calculates an average value of the estimated bias value BE acquired currently and the past estimated bias values BE when the first to third conditions are all met and decides the average value as the bias value B.

According to the sensor bias estimation device 1 of the present embodiment, since the estimated bias value BE is decided as the bias value B of the yaw angular velocity sensor 2 when all of the first condition, the second condition, and the third condition are met, it is possible to prevent the value of the bias value B from significantly deviating from the true value. Also, in the case where the estimated bias value BE when all of the first condition, the second condition, and the third condition are met is acquired multiple times and the average value thereof is decided as the bias value B, a momentary fluctuation can be suppressed.

Concrete embodiments of the present invention have been described in the foregoing, but the present invention is not limited to the above embodiments and may be modified or altered in various ways. For example, the bias decision unit 17 may determined that the estimated bias value BE is a valid value when at least one of the first condition, the second condition, and the third condition is met. Also, the bias decision unit 17 may determine that the estimated bias value BE is a valid value when at least two of the first condition, the second condition, and the third condition are met.

The invention claimed is:

1. An azimuth estimation device for estimating an azimuth of a vehicle, the azimuth estimation device being constituting a part of a high accuracy own-vehicle position detection device of the vehicle, the azimuth estimation device comprising:
   a yaw angular velocity sensor detecting a yaw angular velocity of the vehicle;
   a GNSS (Global Navigation Satellite System) unit receiving the GNSS signal and acquiring the azimuth of the vehicle as a GNSS azimuth based on the GNSS signal;
   a sensor bias estimation device for estimating a bias of the yaw angular velocity sensor,
   a yaw angular velocity correction unit subtracting the bias from the yaw angular velocity output from the yaw angular velocity sensor to output a yaw angular velocity correction value; and
   a sensor azimuth estimation unit integrating the yaw angular velocity correction value thereby to calculate a corrected sensor azimuth,
   wherein the sensor bias estimation device, the yaw angular velocity correction unit, and the sensor azimuth estimation unit are configured by an electronic control device which includes a CPU, a non-volatile memory, and a volatile memory,
   wherein the sensor bias estimation device comprises,
   a bias estimation unit that acquires a yaw angular velocity integrated value by integrating the yaw angular velocity acquired from the yaw angular velocity sensor, acquires the GNSS azimuth, and acquires an estimated bias value based on an azimuth difference which is a difference between the yaw angular velocity integrated value and the GNSS azimuth;
   a first determination unit that determines whether a first condition that an accuracy of the GNSS azimuth acquired from the GNSS unit is within a prescribed range is met;
   a bias decision unit that decides the estimated bias value as the bias of the yaw angular velocity sensor when the first condition is met;
   a stationary state bias estimation unit that acquires a stationary state bias based on a signal from the yaw angular velocity sensor when the vehicle is stopped; and
   a second determination unit that determines whether a second condition that a difference between the estimated bias value and the stationary state bias is within a prescribed range is met,
   wherein the bias decision unit decides the estimated bias value as the bias of the yaw angular velocity sensor when the first condition and the second condition are met.

2. The sensor bias estimation device according to claim 1, comprising a third determination unit that determines whether a third condition that the estimated bias value is within a prescribed range is met,
> wherein the bias decision unit decides the estimated bias value as the bias of the yaw angular velocity sensor when the first condition and the third condition are met.

3. The sensor bias estimation device according to claim 1, comprising a third determination unit that determines whether a third condition that the estimated bias value is within a prescribed range is met,
> wherein the bias decision unit decides the estimated bias value as the bias of the yaw angular velocity sensor when the first condition, the second condition, and the third condition are met.

4. The sensor bias estimation device according to claim 3, wherein the bias estimation unit estimates the estimated bias value at a prescribed time interval, and
> the bias decision unit decides an average value of multiple estimated bias values acquired when all of the first condition, the second condition, and the third condition are met as the bias of the yaw angular velocity sensor.

5. The sensor bias estimation device according to claim 1, wherein the bias estimation unit acquires the yaw angular velocity integrated value by integrating the yaw angular velocity from which the estimated bias value is subtracted.

\* \* \* \* \*